A. DE CLAIRMONT.
SPARK PLUG TESTER.
APPLICATION FILED NOV. 28, 1910.
1,014,207.
Patented Jan. 9, 1912.
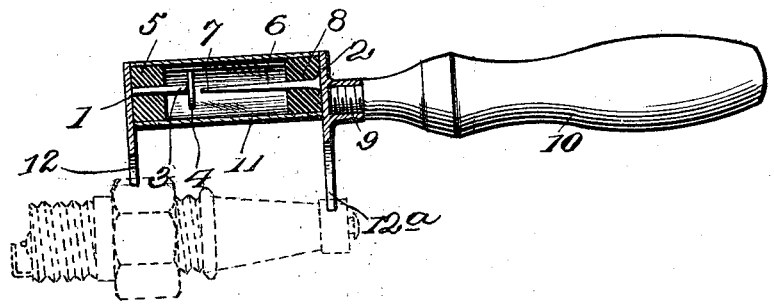
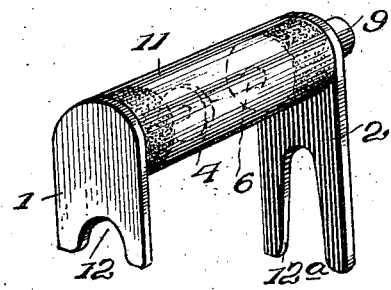
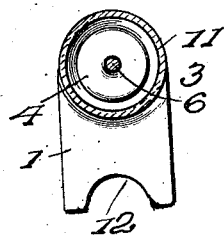
Inventor
A. de Clairmont

UNITED STATES PATENT OFFICE.

ADOLFO DE CLAIRMONT, OF TOLEDO, OHIO.

SPARK-PLUG TESTER.

1,014,207.

Specification of Letters Patent. Patented Jan. 9, 1912.

Application filed November 28, 1910. Serial No. 594,598.

*To all whom it may concern:*

Be it known that I, ADOLFO DE CLAIRMONT, a citizen of the United States, residing at Toledo, in the county of Lucas and State of Ohio, have invented certain new and useful Improvements in Spark-Plug Testers, of which the following is a specification.

This invention comprehends certain new and useful improvements in accessories for internal combustion engines of automobiles and the like, and relates particularly to a device for testing the spark plugs of the engine or motor, being especially designed for a motor embodying more than one cylinder as is almost universally adopted at the present time, and where, without the use of a testing device such as I have invented, the owner of an automobile or the mechanician is put to considerable trouble to determine which cylinder is missing.

Without the use of a device of this character, it is obviously necessary, in order to find a cylinder that is missing owing to a defective spark plug, to go to the vibrator and test out in order to ascertain the defective cylinder, or short circuit the spark plug connections on all of the cylinders except one, each cylinder being thereby tested in turn to determine in which one the charge fails of ignition.

I am aware that it has been proposed to provide devices for testing spark plugs, said devices being designed to be applied to a plug so as to form a visible spark crossing a gap provided for that purpose, but most of these devices as heretofore constructed have been open to the same objection that is incidental to that method of testing a spark plug by unfastening one of the connections to provide a gap across which the current might jump to produce a spark, namely that the spark is thus produced in the open air with the attendant danger of igniting the gasolene vapors which are liable to be collected or generated around the carbureter and other exposed parts of a gasolene motor.

With the knowledge of these conditions my invention has for its primary object a simple and efficient device for testing spark plugs, the same being provided with an inclosed gap visible through a glass or other inclosed element, whereby the spark may be at once seen if produced, without the exposure and danger above referred to. And the invention has for a further object a very simple instrument of this character which may be easily and instantly applied to a spark plug without the necessity of even temporary connection thereto, and which may be composed of comparatively few parts that may be easily and cheaply manufactured and readily assembled.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawing, in which:

Figure 1 is a longitudinal sectional view of a spark plug tester constructed in accordance with my invention; Fig. 2 is a perspective view of the body portion of the device; and, Fig. 3 is a transverse section thereof.

Corresponding and like parts are referred to in the following description and indicated in all the views of the drawing by the same reference characters.

My improved spark plug tester embodies end plates 1 and 2 that are composed of any metal that will carry an electric current, the end plate 1 being formed with a preferably integral stem 3 provided at its inner end with a transversely disposed flat faced disk 4, the stem 3 passing through a preferably cylindrical plug 5 of rubber or some other insulating substance. The end plate 2 is correspondingly formed with a stem 6 which is tapered at its inner end to a point, as indicated at 7, said point being disposed centrally to the inner face of the disk 4 and in close proximity thereto, but spaced therefrom sufficiently to form a gap. The stem 6 passes through an insulating plug 8 similar to the plug 5. The plate 2 is formed with a preferably interiorly threaded boss 9 designed for the reception of one end of a handle 10 of wood or the like, whereby to secure the handle to the body portion of the device. The disk 4 and point 7 are inclosed in a tube 11 preferably formed of glass or some other translucent substance, whereby the spark produced at the gap between the disk and point may be easily viewed, without the dangers that accompany an exposed spark. The outer end plate 1 is formed with a laterally projecting portion, preferably recessed at its edge, as indicated at 12, and the innermost end plate 2 is correspondingly extended laterally, but farther than the end plate 1, the laterally projecting side of the end plate 2 being forked, as indicated at 12ª.

In the practical use of my improved spark plug tester, the recessed outermost end plate 1 is applied to the base portion of the plug to be tested, while the forked end plate is applied to the neck of the spark plug where are located the wiring connections with the battery or magneto. The tester is merely applied to the plug, being grasped by the handle 10 and it is not necessary to even temporarily attach the tester to the plug. If the plug is working, it is obvious that when the tester is applied there will immediately appear a spark inside of the tube 11 showing that the spark plug is in working order.

Having thus described the invention, what is claimed is:

1. A spark plug tester, comprising end plates each of which is formed with a lateral extension, one extension being extended farther than the other, the shorter extension being formed with a recessed edge and the longer extension with a fork, stems formed in the respective end plates and extending in longitudinal alinement with each other with adjoining ends in close proximity but spaced from each other, insulating plugs through which the plugs extend, and a translucent tube surrounding said stems and connected to said plugs.

2. A spark plug tester, comprising end plates each of which is formed with a lateral extension, one extension being extended farther than the other, the shorter extension being formed with a recessed edge and the longer extension with a fork, stems formed in the respective end plates and extending in longitudinal alinement with each other with adjoining ends in close proximity but spaced from each other, insulating plugs through which the stems extend, and a translucent tube surrounding said stems and connected to said plugs the innermost end plate being formed with a boss, and a handle of insulating material secured to said boss.

In testimony whereof, I affix my signature in presence of two witnesses.

ADOLFO DE CLAIRMONT. [L. S.]

Witnesses:
   E. M. KEINATH,
   RAY HARPER.